United States Patent [19]

Chambers et al.

[11] Patent Number: 5,474,819
[45] Date of Patent: Dec. 12, 1995

[54] BONDED ARTICLE

[75] Inventors: Derek R. Chambers; Michael Carpenter, both of Swindon, United Kingdom

[73] Assignee: Raychem Limited, United Kingdom

[21] Appl. No.: 613,909

[22] PCT Filed: Jun. 8, 1989

[86] PCT No.: PCT/GB89/00640

§ 371 Date: Dec. 7, 1990

§ 102(e) Date: Dec. 7, 1990

[87] PCT Pub. No.: WO89/11964

PCT Pub. Date: Dec. 14, 1989

[30]     Foreign Application Priority Data

Jun. 8, 1988  [GB]  United Kingdom .................. 8813575

[51] Int. Cl.[6] .............................. B29D 31/00; F16L 47/00
[52] U.S. Cl. ................. 428/34.9; 428/474.4; 428/475.2; 174/DIG. 8; 264/151; 264/209.1; 264/230; 264/485; 264/488
[58] Field of Search ............................ 428/34.9, 474.4, 428/475.2; 174/DIG. 8; 264/22, 151, 209.1, 230

[56]                References Cited

U.S. PATENT DOCUMENTS

| 3,491,799 | 1/1970 | Foll | 138/137 |
|---|---|---|---|
| 3,949,110 | 4/1976 | Nakajima et al. | 428/36 |
| 4,118,260 | 11/1978 | Boettcher | 156/85 |
| 4,422,890 | 12/1983 | Penneck | 156/73.5 |

FOREIGN PATENT DOCUMENTS

| 46027 | 2/1982 | European Pat. Off. . | |
| 138258 | 4/1985 | European Pat. Off. . | |
| 61344 | 8/1989 | European Pat. Off. . | |
| 746359 | 3/1956 | United Kingdom . | |
| 1151788 | 5/1969 | United Kingdom | B29D 31/00 |
| 1262978 | 2/1972 | United Kingdom . | |

Primary Examiner—Charles R. Nold
Attorney, Agent, or Firm—Sheri M. Novack; Herbert G. Burkard

[57]            ABSTRACT

A hollow, heat-recoverable article 1, for enclosing objects such as electronic components etc. has a thermoplastic lining on its interior surface and includes a fusion bonded portion 2 in which different parts of the article have been brought together and bonded by fusion of the lining with substantially no welding of the heat-recoverable material forming the wall. The lining has a melting point that is higher than the recovery temperature of the article, thereby enabling subsequent recovery of the article without rupture of the bonded portion.

10 Claims, 1 Drawing Sheet

BONDED ARTICLE

This invention relates to heat-shrinkable articles for use in enclosing objects.

BACKGROUND OF THE INVENTION

A heat recoverable article is an article the dimensional configuration of which may be made substantially to change when subjected to heat treatment.

Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962, 3,086, 242 and 3,957,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form, but in other applications, a preformed dimensionally heat-stable article is deformed to a dimensionally heat-unstable form in a separate stage.

In the production of heat recoverable articles, the polymeric material may be cross-linked at any stage in the production of the article that will enhance the desired dimensionally recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, applications of heat will cause the article to assume its original heat-stable shape.

Such articles have been widely used for many years for enclosing objects such as electrical equipment, wiring and the like in order to protect them from the environment and to provide electrical insulation. The articles may be extruded in the form of a tube or may be formed as discrete pieces by moulding operations, and in either case a layer of adhesive may be provided on the interior surface of the article. However the production of moulded articles is a relatively expensive process involving performing operations on individual items which makes the cost of such articles inappropriate for certain applications. It has been proposed, for example in U.K. applications Nos. 2083403 and 2095617 to form discrete articles by welding together parts of tubing that may be rendered heat-recoverable either before or after the welding step. Such welding processes have the disadvantage that it is not possible, or at least very difficult, to provide the articles with an internal layer of adhesive.

SUMMARY OF THE INVENTION

According to the present invention there is provided a hollow, heat-recoverable article for enclosing part of an object, the article having a thermoplastic lining on its interior surface and including a fusion bonded portion in which different parts of the article have been brought together and bonded together by fusion of the lining with substantially no welding of the heat-recoverable material forming the article wall, the thermoplastic lining having a softening point that is higher than the recovery temperature to enable the article to be recovered without rupture of the fusion bonded portion.

The invention has the advantage that discrete articles that have a number of configurations, and which are provided internally with a layer of adhesive may be manufactured at a very low cost. The articles may be formed by a process which comprises forming a heat-recoverable sheet or tube of material that has a thermoplastic lining, bringing together opposed portions of one or more such sheets or of the tube and bonding them together by fusion of the thermoplastic lining with substantially no welding of the material forming the sheet or tube wall, the thermoplastic lining having a softening point that is higher than the recovery temperature of the heat-recoverable material. After the fusion bonding step the tube or strip may be cut to form the discrete articles. Since the cutting process is the last step in the production of the articles it is not usually necessary to perform any operations on the discrete articles during manufacture.

Although the tube or sheet will normally be rendered dimensionally-recoverable before the bonding operation it may be possible in certain circumstances to form the bond before the tube or sheet is rendered recoverable. The tube or sheet may be rendered dimensionally recoverable by the conventional method in which it is crosslinked either by irradiation or chemically, heated, expanded e.g. by stretching in the case of sheet or pneumatically in the case of a tube, and then quenched in its expanded state. If this method is employed the recovery temperature of the article will correspond to the crystalline melting point of the wall material. Alternatively the tube or sheet may be rendered heat-recoverable by being expanded at a temperature below the crystalline melting point of the material, and, if desired, subsequently being cross-linked. If this method is employed the recovery temperature will correspond to the initial stretching temperature.

The thermoplastic lining preferably has a melting or softening point that is at least 10° C., more preferably at least 20° C., especially at least 30° C. and most especially about 40° C. above the recovery temperature of the article, in order to ensure that the bond does not rupture during recovery of the article.

In many instances and especially with relatively highly amorphous materials forming the thermoplastic lining, the material will not soften at a single, well defined temperature but instead will soften and flow or otherwise fuse over a temperature range, and the softening characteristics of the components may be observed by thermomechanical analysis (TMA) as described in "Thermal Analysis" by T. Daniels published by Kogan Page 1973. Accordingly, the fusion temperature or the softening point of the thermoplastic lining is defined herein as being the temperature at which the TMA probe has penetrated to 60% of the total thickness of the material, usually referred to as $T_{60}$. TMA data may be obtained using a 6.35 mm diameter flat profile probe loaded with a 50 gramme weight.

In the broadest aspect of the invention the article may have any recovery ratio, i.e. the ratio of the dimensions of the article in the direction of recovery before and after recovery. However, the article preferably has a relatively high recovery ratio, e.g. at least 2.5:1 or higher, e.g. at least 3:1 or even at least 3.5:1. High recovery ratio articles have the advantage that the thickness of the thermoplastic layer increases considerably in those regions of the article that are allowed to recover without restriction. The increase in thickness of the thermoplastic lining together with the shrinkage of the article can cause the lining to form a plug of thermoplastic sealant in the end of the article which seals the end of the article against water and air ingress and effectively forms a cap. Different parts of the article may be heated to different temperatures if desired during installation. For example, a part of the article that contains a bond formed by the liner may be heated only sufficiently to cause recovery of the article, while other parts may be heated enough to cause the lining to fuse and form a seal.

Any polymeric material which can be crosslinked and to which the property of dimesional recoverability may be imparted such as those described in British patent No. 990,235, may be used to form the articles. Polymers which may be used include polyolefins such as polyethylene and ethylene copolymers for example with propylene, butene, hexene, octene, vinyl acetate or other vinyl esters, methyl or ethyl acrylate, polyamides, polyurethanes, polyvinyl chloride, fluoropolymers and polyesters e.g. polybutylene terephthalate and block copolymers of polybutylene terephthalate with polybutylene ether terephthalate. One particularly preferred group of polymers are ionomers such as those having carboxylate crosslinking sites. The recovery temperature of the article will depend on the choice of polymer and on the manufacturing process but is preferably in the range of from 70° to 120° C., and especially from 80° to 100° C.

The polymeric composition may be cross-linked, for example, by exposure to high energy radiation such as an electron beam or gamma-rays. Radiation dosages in the range 20 to 800 kGy, preferably 20 to 500 kGy, e.g. 20 to 200 kGy and particularly 40 to 120 kGy are in general appropriate depending on the characteristics of the polymer in question. For the purposes of promoting cross-linking during irradiation, preferably from 0.2 to 15 weight per cent of a crosslinking promotor such as a poly-functional vinyl or allyl compound, for example, triallyl cyanurate, triallyl isocyanurate (TAIC), methylene bis acrylamide, metaphenylene diamine bis maleimide or other crosslinking agents, for example as described in U.S. Pat. Nos. 4,121,001 and 4,176,027, are incorporated into the composition prior to irradiation.

The polymeric composition may include additional additives, for example reinforcing or non-reinforcing fillers, stabilisers such as ultra-violet stabilisers, antioxidants, acid acceptors and anti-hydrolysis stabilisers, pigments, processing aids such as plasticizers, halogenated or non-halogenated flame retardants, fungicides and the like.

The thermoplastic lining may be formed from any of the polymers mentioned above for the material provided that it has a softening point above the recovery temperature of the article, preferably at least 10° C. above the recovery temperature and especially at least 20° C. above the recovery temperature. The thermoplastic lining is preferably formed from a material known conventionally as a hot-melt adhesive for example a polyamide, an olefin homo- or copolymer such as ethylene vinyl acetate copolymer, or a polyester. The preferred polyamides are characterized by the fact that their amide linkages are separated by an average of at least fifteen carbon atoms and have amorphous structures in contrast with the more highly crystalline, fibre forming polyamides such as nylon 6 or nylon 6.6.

Any of the techniques conventionally employed for fusing together polymeric materials may be employed in the process of the present invention, e.g. radio frequency, ultrasonic or hot bar welding, and pressure may additionally be applied to ensure a satisfactory bond.

The articles according to the invention may be formed in a variety of configurations depending on their use. For example a pair of sheets, each coated on one side with a lining of hot-melt adhesive may be brought together and bonded along their longitudinally extending lateral edges to form a generally tubular structure which may have a uniform or non-uniform cross-section. Instead a pair of longitudinally stretched sheets may be brought together and bonded by a number of transversely extending seams to form an array of open-ended tubes as described in British patent application No. 2082110. In yet another form of device opposite walls of a tube may be brought together and bonded along a short longitudinally extending seam in order to bifurcate the tube. With all forms of device the tube or sheets may be cut during or after the bonding step to form the discrete articles. Alternatively a line of weakness e.g. a row of perforations or a tear-weld may be formed either along the line of the bond or along a different line during, or subsequent to, the bonding step so that individual articles may be removed manually as desired.

The articles usually will have a recoverable wall thickness in the range of from 0.5 to 0.3, and especially from 0.1 to 0.2 mm, and a thermoplastic lining thickness in the range of from 0.05 to 0.2 mm, or alternatively from 0.1 to 0.4 mm, and especially from 0.15 to 0.25 mm, making a total wall thickness of about 0.25 to 0.45 mm in the preferred case.

The articles according to the invention may be used for a number of purposes, for example they can be used for enclosing electrical and electronic components to protect and isolate them, for capping electrical cables and harnesses, for enclosing branch-outs for electrical harnessing and for providing identifying labels to wires and other articles.

Two articles in accordance with the present invention will now be described by way of example with reference to the accompanying drawings in which:

DETAILED DESCRIPTION OF THE PREFERRED EMBODIMENTS

Referring to the accompanying drawings a heat-shrinkable article has been formed by co-extruding a tube 1 of an ionomer sold under the trade name Surlyn with an internal lining of an ethylene vinyl acetate hot-melt adhesive. The ionomer was crosslinked by irradiation, the polyamide adhesive containing a small quantity of a conventional crosslinking inhibitor to prevent crosslinking during irradiation of the tube. After formation, the tube was heated to a temperature above the melting point of the ionomer, pneumatically expanded to approximately four times its original lateral dimensions and quenched to ambient temperature in order to lock the material in its expanded state. Afterwards the tubing is advanced through a conventional r.f. welding apparatus during which the jaws of the apparatus force opposed walls of the tube together at the portion 2 thereof and cause the hot-melt adhesive to melt and bond the opposed walls together.

After the bond has been formed the tube may be cut transversely across the bond so formed and also across the tube in a position between the bonds to form the individual articles.

The article, in the form of an end cap may simply be positioned over the object or the end of the object to be enclosed and can be recovered by means of a hot air gun without rupture of the adhesive.

Figure 1:
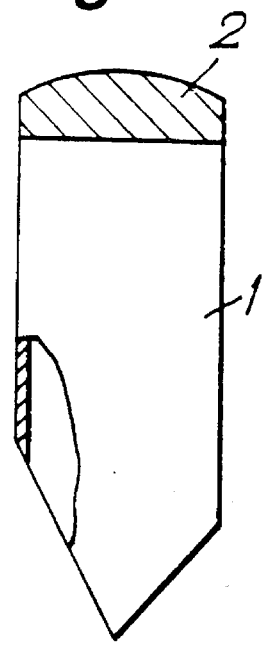
FIG. 1 is a side view of one form of article in accordance with the invention.
Figure 2:
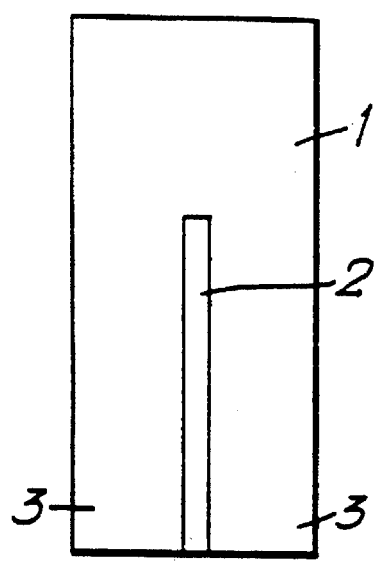
FIG. 2 is a side view of two further forms of article in accordance with the invention.
Figure 3:
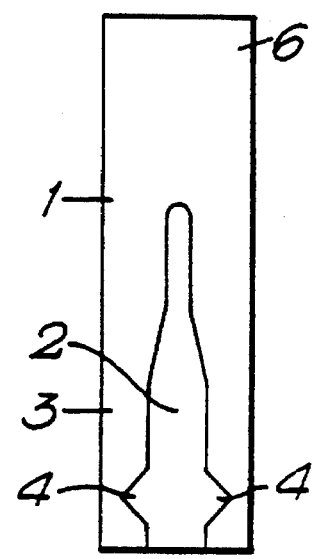
Figure 3:
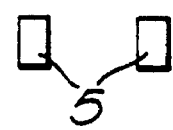

FIG. 2 shows a second form of article that is in the form of a branch-out. This form of article is manufactured in the same way as that shown in FIG. 1 with the exception that the area 2 of the tube that is subjected to the r.f. welding operation extends longitudinally rather than transversely as shown in FIG. 1. After the bonding step the tube can be cut transversely to form the article as shown and optionally may be slit along the centre of the bonded area 2 to separate the two legs 3 formed by the bonding step. The article may be recovered over a branch in a cable harness by means of a hot air gun in a conventional manner.

FIG. 2 shows yet another form of article that is similar to that shown in FIG. 1. In this form of device a weld area 2 having a relatively large width has two extensions 4 that form slight constrictions in the legs of the article. After the object to be enclosed, for example one or more small electrical or electronic components supported by leads or wires, has been inserted in the article, a pair of fusible polyamide based hot-melt adhesive sleeves 5 may be inserted into the end of each leg 3 until it abuts the constriction formed by the extension 4.

The article is then heated by means of one or more hot-air guns to recover the article and melt the sleeves 5, thereby forming a sealed and water resistant assembly. In this instance, the article had a recovery temperature of about 80° C., the thermoplastic lining had a softening point of about 140° C., and the two sleeves 5 had a melting point of about 105° C.

If desired "top" end 6 of the article may be heated to a higher temperature, e.g. by means of another hot-air gun, in order to melt the thermoplastic lining in that area and thereby to form a seal.

We claim:

1. A hollow, heat-recoverable article for enclosing part of an object, the article having a thermoplastic lining on its interior surface and including a fusion bonded portion in which different parts of the article have been brought together and bonded together by fusion of the lining with substantially no welding of the heat-recoverable material forming the article wall, the thermoplastic lining having a softening point that is at least 20° C. higher than the recovery temperature to enable the article to be recovered without rupture of the fusion bonded portion.

2. An article as claimed in claim 1, which has a recovery ratio of at least 3:1.

3. An article as claimed in claim 2, wherein the article has a recovery ratio of at least 3.5:1.

4. An article as claimed in claim 1, wherein the thermoplastic lining comprises a polyamide, an olefin homo- or copolymer or a polyester.

5. An article as claimed in claim 1, wherein the material forming the article wall comprises an ionomer or an olefin homo- or copolymer.

6. An article as claimed in claim 1, which has been formed by bonding together a pair of sheets of material along their side edges.

7. An article as claimed in claim 1, which has been formed by bonding together parts of opposed walls of a tube to furcate the tube.

8. An article as claimed in claim 1, wherein the thermoplastic lining has a thickness in the range of from 0.05 to 0.2 mm.

9. An article as claimed in claim 1, wherein the heat-shrinkable material forming the wall is cross-linked.

10. A process for the manufacture of a heat-recoverable article which comprises forming a heat-recoverable sheet or tube of material that has a thermoplastic lining, bringing together opposed portions of one or more such sheets or of the tube and bonding them together by fusion of the thermoplastic lining with substantially no welding of the material forming the sheet or tube wall, the thermoplastic lining having a softening point that is at least 20° C. higher than the recovery temperature of the heat-recoverable material.

* * * * *